(12) United States Patent
Mizumura

(10) Patent No.: US 9,284,988 B2
(45) Date of Patent: Mar. 15, 2016

(54) GUIDE DEVICE

(75) Inventor: Yoshinori Mizumura, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/236,377

(22) PCT Filed: Jul. 12, 2012

(86) PCT No.: PCT/JP2012/004528
§ 371 (c)(1),
(2), (4) Date: Jan. 31, 2014

(87) PCT Pub. No.: WO2013/027325
PCT Pub. Date: Feb. 28, 2013

(65) Prior Publication Data
US 2014/0153849 A1 Jun. 5, 2014

(30) Foreign Application Priority Data

Aug. 23, 2011 (JP) ................................. 2011-181507
Jul. 11, 2012 (JP) ................................. 2012-155787

(51) Int. Cl.
*F16C 29/06* (2006.01)
*F16C 43/06* (2006.01)
(Continued)

(52) U.S. Cl.
CPC ............... *F16C 43/06* (2013.01); *F16C 19/502* (2013.01); *F16C 29/005* (2013.01); *F16C 29/0611* (2013.01); *F16C 29/0642* (2013.01)

(58) Field of Classification Search
CPC .... F16C 43/06; F16C 29/0642; F16C 29/005; F16C 29/0611; F16C 29/04; F16C 29/06; F16C 29/0602
USPC .............. 384/43–45, 46, 49, 50, 59, 510, 537
See application file for complete search history.

(56) References Cited

U.S. PATENT DOCUMENTS 5,244,283 A * 9/1993 Morita ............................ 384/44
6,547,437 B2 * 4/2003 Kamimura et al. ............. 384/45
(Continued)

FOREIGN PATENT DOCUMENTS

EP 0 443 098 A1 8/1991
JP 57-67114 4/1982
(Continued)

OTHER PUBLICATIONS

English Translation of International Preliminary Report on Patentability (PCT/IB/338) and Written Opinion (PCT/ISA/237) dated Mar. 6, 2014 (six (6) pages).
(Continued)

*Primary Examiner* — James Pilkington
(74) *Attorney, Agent, or Firm* — Crowell & Moring LLP

(57) ABSTRACT

A guide device is provided in which rolling elements can be assembled into circulation paths in a short time. A slider body is provided with rolling element insertion holes open at positions of a member mounting surface superposed over a return passage. The insertion holes extend in the length directions of leg parts and reach positions which bisect cross-sections of the return passage. The opened shapes of the insertion holes are elongated hole shapes with dimensions in the rolling element movement direction larger than dimensions in the width directions. For this reason, if balls are inserted from the rolling element insertion holes, spaces are formed inside of the return passage visible from the rolling element insertion holes in the rolling element movement direction of the balls. A rod-shaped fixture is inserted into each space to press the balls in the rolling element movement direction of the return passage.

6 Claims, 9 Drawing Sheets

(51) Int. Cl.
*F16C 19/50* (2006.01)
*F16C 29/00* (2006.01)

(56) References Cited

U.S. PATENT DOCUMENTS

| 2001/0017951 | A1 | 8/2001 | Kamimura et al. |
| 2004/0232299 | A1 | 11/2004 | Kato et al. |
| 2007/0133910 | A1 | 6/2007 | Xu et al. |

FOREIGN PATENT DOCUMENTS

| JP | 62-101914 A | 5/1987 |
| JP | 4-211715 A | 8/1992 |
| JP | 2001-241437 A | 9/2001 |
| JP | 2003-184875 A | 7/2003 |
| JP | 2006-64108 A | 3/2006 |

OTHER PUBLICATIONS

Corresponding International Search Report with English Translation dated Aug. 7, 2012 (four (4) pages).
Japanese-language Written Opinion dated Aug. 7, 2012 (PCT/ISA/237) (three (3) pages).
Japanese Office Action dated Jul. 29, 2014, with English translation (Six (6) pages).
Taiwanese Office Action dated Feb. 26, 2015, with English translation (Seven (7) pages).

* cited by examiner

GUIDE DEVICE

TECHNICAL FIELD

This invention relates to a guide device having a guide rail, a slider, and rolling elements (linear guide device having a guide rail of a predetermined length or a curved guide device having an endless guide rail).

BACKGROUND ART

A linear guide device or curved guide device is provided with a guide rail, a slider constituted by a slider body and end caps fastened at the two end parts in the movement direction, and a plurality of rolling elements. The guide rail and slider have rolling surfaces arranged to face each other and constitute a rolling passage of the rolling elements. The slider further has a return passage of rolling elements and a direction changing path which communicate the return passage and the rolling passage. Further, the rolling passage, the return passage, and the direction changing path constitute a circulation path of the rolling elements. By the rolling elements being circulated through the circulation path, one of the guide rail and the slider moves relative to the other in the rail direction. FIG. 10 is a perspective view which shows an example of a curved guide device. As shown in FIG. 10, the curved guide device has an endless guide rail 1 and a slider 2.

When assembling rolling elements in the circulation path of such a guide device, in a guide device with no holder which holds the rolling elements, first the following is performed. In the case of a linear guide device, one end cap is attached to one end part of the slider body in the movement direction, then this is made to slide and move from the end part of the guide rail to place the two leg parts of the slider body and end cap guide at the two sides of the rail in the width direction. In the case of a curved guide device, the slider body is placed over the guide rail to arrange the two leg parts of the slider body at the two sides of the guide rail in the width direction, then split members of an end cap, split into left and right parts, are attached to one end part of the slider body in the movement direction from the outside and inside of the guide rail.

Next, rolling elements are inserted from the other end of the slider body in the movement direction at which no end cap is attached to the rolling passage, return passage, and direction changing path of the end cap attached to the slider body. Next, rolling elements are inserted into the direction changing path of the other end cap and this end cap is fastened to the other end part of the slider body in the movement direction.

As a guide device, there is a preloaded device to which a preload is applied to improve the rigidity. In the case of such a preloaded device, unless a pressing force is exerted, the rolling elements in the rolling passage cannot move. It takes time particularly for the work of assembling the rolling elements.

Patent Document 1 describes a curved guide device having an endless guide rail. The slider body (casing) is formed with rolling element insertion holes (assembly holes) for inserting rolling elements to the circulation path. The rolling element insertion holes communicate with the return passages and open to the outside and that after inserting the rolling elements, the holes are then sealed by plugs.

In the specific example of Patent Document 1, the opened shapes of the rolling element insertion holes are circular. The holes open at the two side surfaces of the slider body in the width direction. Plugs are inserted into these insertion holes, and then the plugs are fastened to the slider body by fastening pins inserted from the top surface of the slider body (member mounting surface). Besides, Patent Document 1 does not describe the method of insertion of the rolling elements.

Patent Document 2 describes assembling balls into a curved guide device (slewing bearing) by cutting away parts of the two side surfaces of the slider body (bearing body) so as to include the outside halves of the grooves of the return passages and constitute lids, removing the lids and inserting balls from the return passages to the circulation path, and attaching the lids to prevent the balls from escaping. In this method, however, since the parts of the lids are large, it is necessary to increase the dimension of the slider body in the width direction so as to secure rigidity of the slider body. In addition, since the return passages are split at the lid parts, the structure becomes complicated and a high precision is needed for the working and assembling.

PRIOR ART DOCUMENTS

Patent Documents

Patent Document 1: JP 2001-241437 A
Patent Document 2: JP S62-101914 A

SUMMARY OF INVENTION

Problem to be Solved

The object of the present invention is to enable insertion of rolling elements into a circulation path of a guide device in a short time with a simple structure even for a preloaded device.

Solution to the Problem

In order to solve the above problem, there is provided a guide device according to a first aspect of the present invention has following configurations (1) to (4).

(1) the guide device comprising: a guide rail; a slider; and a plurality of rolling elements, wherein the slider comprising leg parts arranged at both sides of the guide rail in a width direction and a body part which connects ends of the leg parts, a surface of the body part at the opposite side from the guide rail being a member mounting surface, the guide rail and slider have rolling surfaces arranged to face each other and constitute a rolling passage of the rolling elements, the slider has a slider body and end caps fastened to both of end parts in the movement direction, the slider body has a return passage of rolling elements, and the end caps each has a direction changing path which communicate the return passage and a rolling passage, the rolling passage, a return passage, and a direction changing path constitute a circulation path of rolling elements, the rolling elements are circulated through the circulation path, and one of the guide rail and slider moves relative to the other along the guide rail.

(2) The slider body has a rolling element insertion hole.

(3) The rolling element insertion hole is open at the member mounting surface of the slider body, extend in a length direction of the leg parts, and communicate with the return passage.

(4) In an opening dimension of the rolling element insertion hole, a dimension of the return passage in the width direction is at least a width of the return passage, and an opened shape of the rolling element insertion hole is an elongated hole shape with a dimension of the return passage in a rolling element movement direction larger than a dimension in the width direction of the return passage. The opened shapes include not only shapes including rectangles with short sides of arc shapes (so-called elongated holes), but also oval shapes (elliptical shapes) or shapes of rectangles with corner parts which are rounded.

The guide device according to the first aspect has an opened shape of the rolling element insertion hole of the slider of the elongated hole shape with the dimension in the rolling element movement direction of the return passage larger than the dimension in a width direction of the return passage. Therefore, at the time of assembly, if an inserting rolling element from the rolling element insertion hole to the return passage, there is a space inside the return passage visible from the opening of the rolling element insertion hole in the rolling element movement direction of the rolling element which is inserted. For this reason, it is possible to insert a rod-shaped member or another fixture into the space to exert a force which pushes rolling element having entered the return passage from the rolling element insertion hole in the rolling element movement direction of the return passage.

Accordingly, even in the case of a preloaded device, it is possible to apply a force to the rolling elements inside of the rolling passage to make them move and easily close the gap between rolling elements inside of the rolling passage. That is, compared with the case where there is no such a space, it is possible to shorten the time relating to the work for assembling rolling elements of a preloaded device.

The guide device according to the first aspect is applicable to either the case of a linear guide device which has a guide rail of a predetermined length and a curved guide device which has an endless guide rail. In particular, in the case of a curved guide device with a guide rail which is endless, assembly of rolling elements in the arc-shaped rolling passages is difficult, so it is useful to apply the guide device according to the first aspect to a curved guide device.

In the guide device according to the first aspect, the rolling element insertion hole preferably reaches a position where a cross section of the return passage is bisected. In addition, the slider preferably has a lid which covers the rolling element insertion hole and has a concave part which holds the lid at the member mounting surface.

In the guide device according to the first aspect, the lid preferably has a shaft part which fits in the rolling element insertion hole and a plate shaped part arranged at the concave part. Thus, the rolling element insertion hole is reliably closed. Additionally, the front end part of the shaft part has a shape which matches a cross-sectional shape of the return passage vertical to the rolling element movement direction. Thus, the rolling elements can smoothly move at the positions where the rolling element insertion holes of the return passages are formed.

Moreover, in the guide device according to the first aspect, there is a bottom surface of the rolling element insertion hole at the both sides of the return passage in the width direction, a front end of the shaft part is formed with a flat part corresponding to the bottom surface, and the flat part is in contact with the bottom surface or faces the bottom surface through a preset gap. Thus, the movement of the rolling element at the position of the return passage where the rolling element insertion hole is formed becomes smoother.

Advantageous Effects of the Invention

According to the guide device of the present invention, it is possible to assemble rolling elements with a simple structure in a short time even for a preloaded device.

DESCRIPTION OF EMBODIMENTS

Hereinafter, embodiments of the present invention will be explained.

Figure 1:
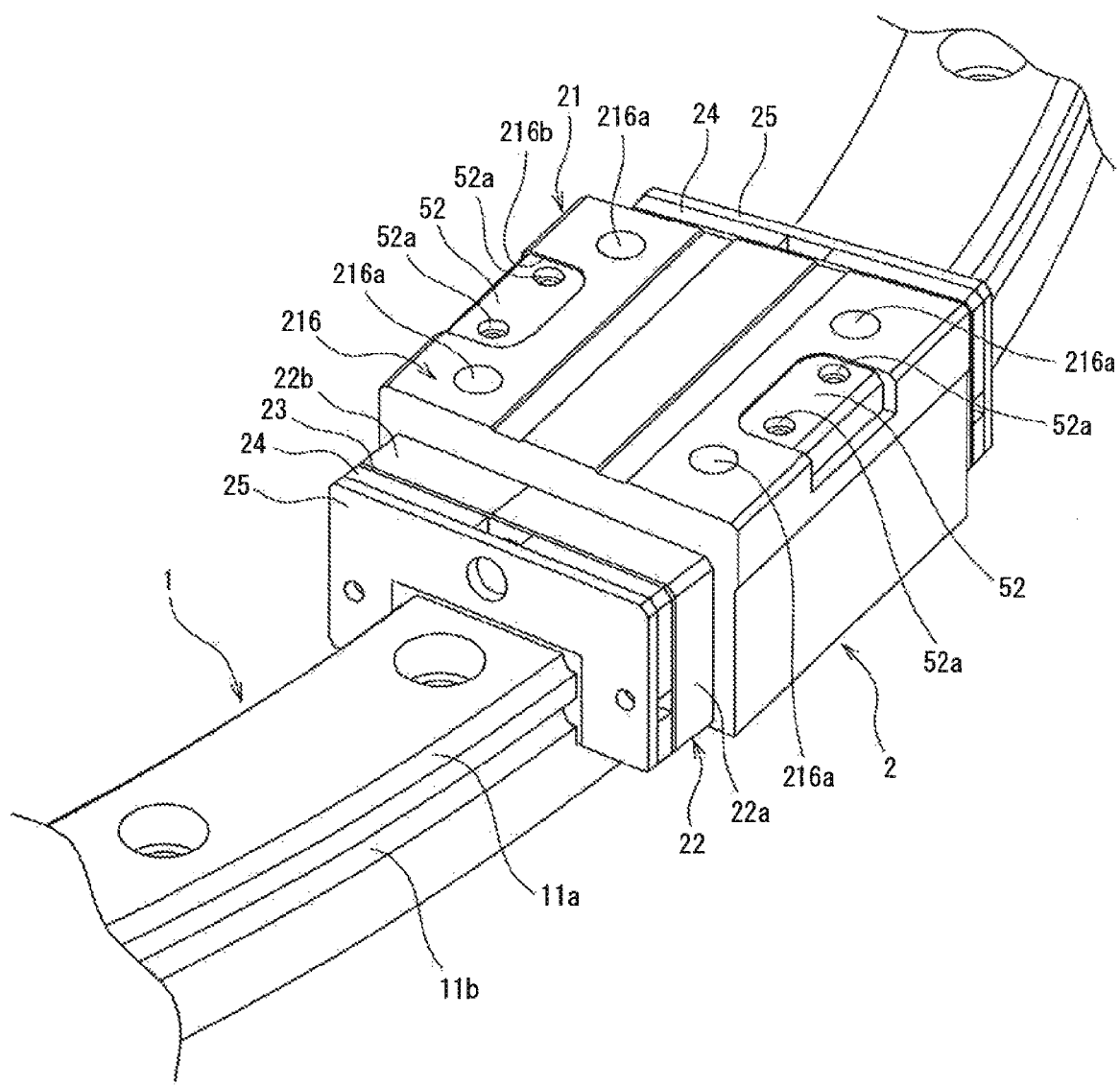
FIG. 1 is a perspective view which shows a guide device of an embodiment.
Figure 2:
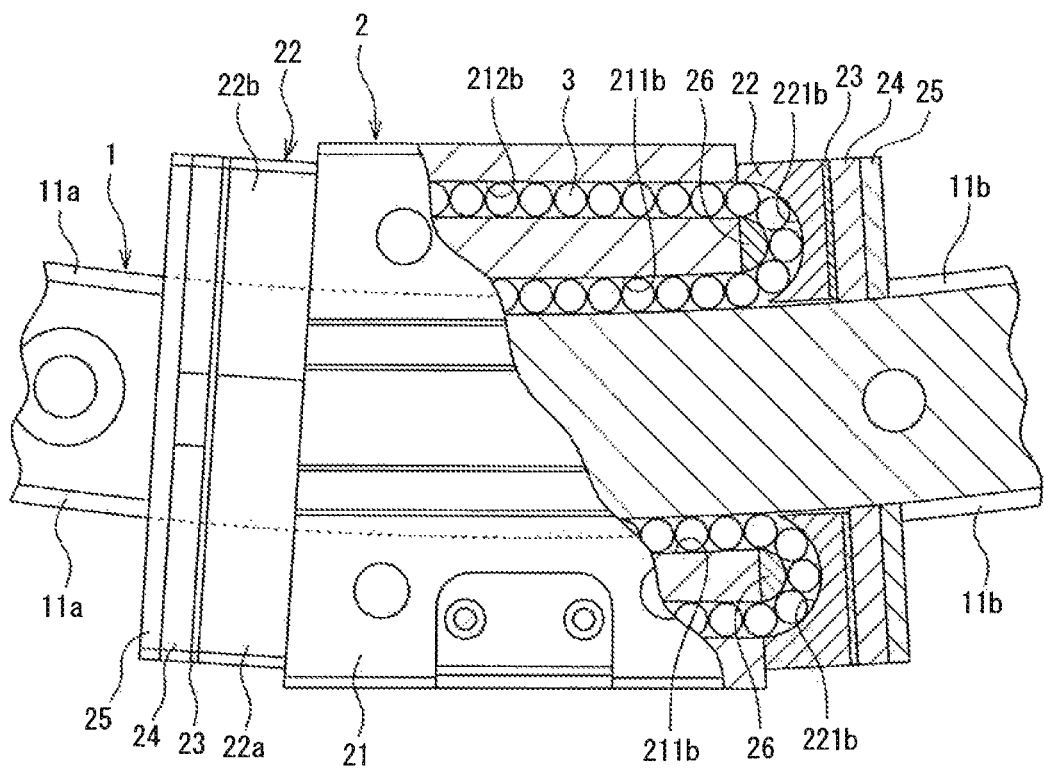
FIG. 2 is a plan view which shows a guide device of an embodiment.

The guide device of this embodiment, as shown in FIGS. 1 and 2, is a curved guide device having a circular (endless) guide rail 1, slider 2, and balls (rolling elements) 3. The slider 2 is constituted by a slider body 21 and end caps 22 fastened to its two end parts in the movement direction, protective plates 23, lubricant-including members 24, side seals 25, and return guides 26. Each of the end caps 22 is constituted by split members 22a and 22b split into two into left and right parts.

This guide device has two pairs of four circulation paths of the balls 3. The upper circulation path will be referred to as "first circulation path" while the lower circulation path will be referred to as "second circulation path". The circular guide rail 1 has rolling grooves (rolling surfaces) 11a and 11b at the two corner parts, the inner circumferential surface, and the outer circumferential surface. The slider 2 has rolling grooves (rolling surfaces) 211a and 211b which extend in arc shapes at positions which face the rolling grooves 11a and 11b of the guide rail 1.

Figure 3:
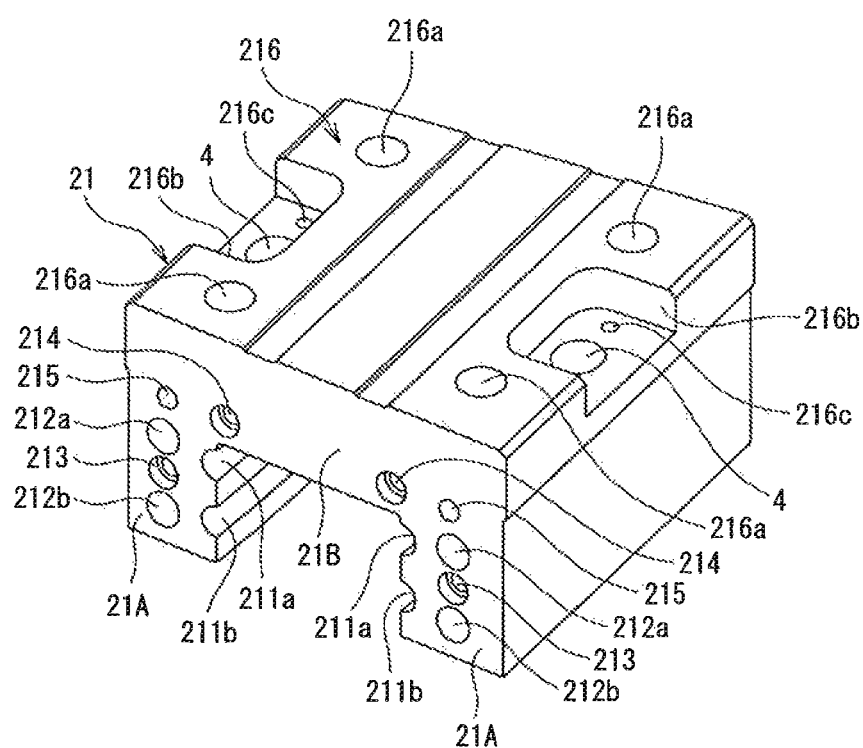
FIG. 3 is a perspective view which shows a slider body which constitutes a guide device of an embodiment.

As shown in FIG. 3, the slider body 21 is constituted by leg parts 21A arranged at the two sides of the guide rail 1 in the width direction and a body part 21B which connects ends of the two leg parts. Rolling grooves 211a and 211b of the slider 2 are formed in the leg parts 21A of the slider body 21. The leg parts 21A of the slider body 21 are formed with return passages 212a and 212b of the balls 3.

The slider body 21 is further formed with mounting holes 213, 214, and 215 for mounting the end caps 22, lubricant-including members 24, and side seals 25 to the slider body 21.

The rolling grooves 11a of the guide rail 1 and the rolling grooves 211a of the slider body 21 constitute a first rolling passage. The rolling grooves 11b of the guide rail 1 and the rolling grooves 211b of the slider body 21 constitute a second rolling passage.

The end caps 22 have a direction changing path which connects the return passages 212a and 212b of the slider body 21 and the first and second rolling passages. FIG. 2 is a partial cross-sectional view. The cross-sectional position is a position along the second circulation path, so the direction changing path 221b which constitutes the second circulation path is displayed. Further, the inside circumferential side of the direction changing path 221b is formed by the return guide 26.

That is, the first rolling passage, a return passage 212a, and a direction changing path constitute a first circulation path of the balls 3. The second rolling passage, return passage 212b, and direction changing path 221b constitute a second circulation path of the balls 3. Further, this guide device circulates balls 3 through the first and second circulation paths whereby the slider 2 circles along the circular guide rail 1.

As shown in FIG. 2, the planar shape of the slider body 21 is an isosceles trapezoid with the side arranged at the inside of the circular guide rail 1 shorter than the side arranged at the outside. As shown in FIGS. 1 and 3, the member mounting surface 216 of the slider body 21 is formed with two mounting holes 216a at an interval along each side.

Between the each two mounting holes 216a, a concave part 216b is formed. At the bottom surface of this concave part 216b, an opening of a rolling element insertion hole 4 and a pair of female threads 216c are formed. As shown in FIG. 1, this concave part 216b has a plate shaped part 52 of a lid 5 which covers the rolling element insertion hole 4 arranged at it.

Figure 4:
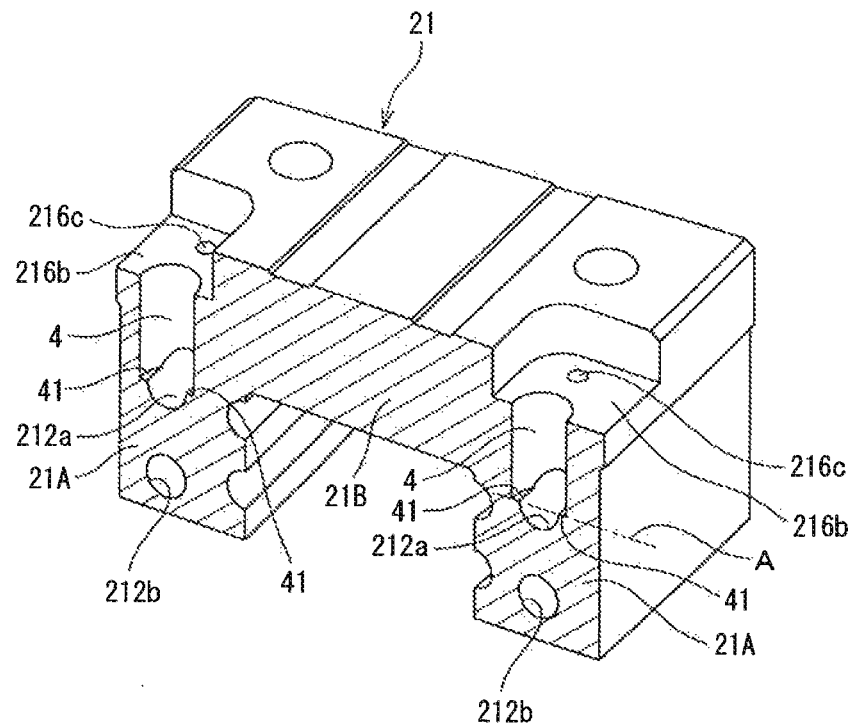
FIG. 4 is a perspective view which splits the slider body of FIG. 3 at the positions of the rolling element insertion holes.

As shown in FIGS. 3 and 4, each rolling element insertion hole 4 opens at a position of the concave part 216b of the member mounting surface 216 overlapping a return passage 212a, extends in the length direction of a leg part 21A of the slider body 21, and reaches a position which bisects the cross-sectional circle of the return passage 212a (line A of FIG. 4).

Figure 5:
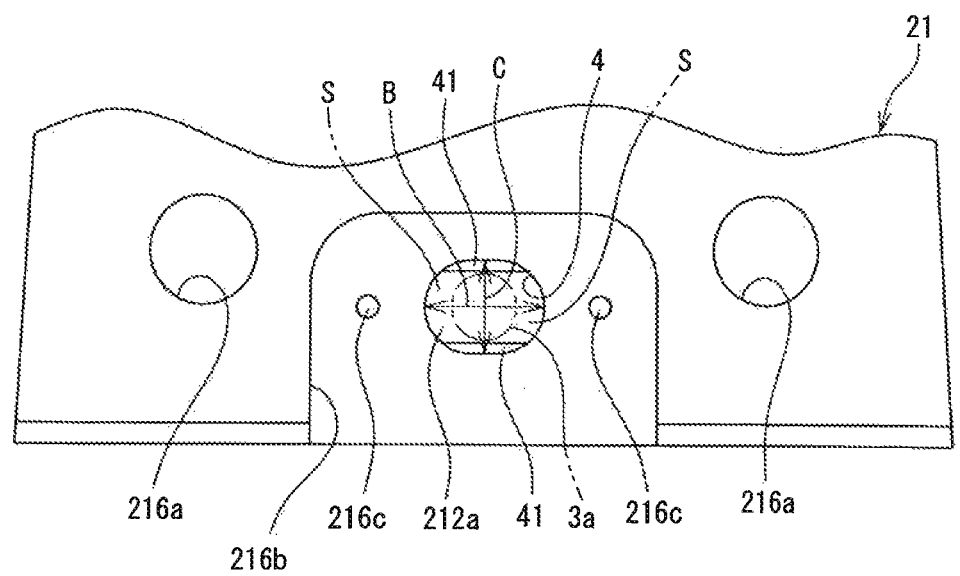
FIG. 5 is a plan view which shows a rolling element insertion hole of a slider body of FIG. 3.

As shown in FIG. 5, the opened shape of each rolling element insertion hole 4 is an elongated hole shape. The dimension B in the rolling element movement direction of the return passage 212a is larger than the dimension C in the width direction of the return passage 212a. Further, the dimension C in the width direction of the return passage 212a of the rolling element insertion hole 4 is larger than the width of the return passage 212a (diameter of cross-sectional circle). Accordingly, at the two sides of the return passage 212a, there is the bottom surface 41 of the rolling element insertion hole 4.

Figure 6:
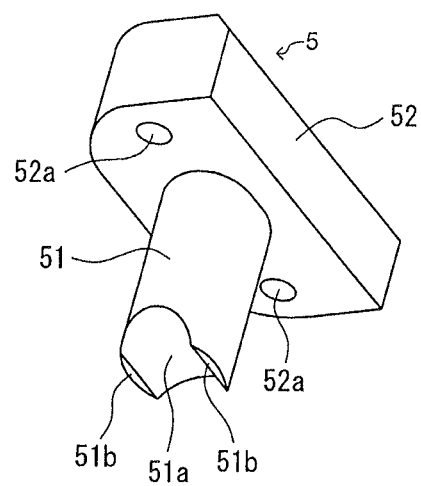
FIG. 6 is a perspective view which shows a lid which closes a rolling element insertion hole of a lid which closes the slider body of FIG. 3.

As shown in FIG. 6, each lid 5 which covers a rolling element insertion hole 4 has a shaft part 51 which fits in the rolling element insertion hole 4 and a plate shaped part 52 arranged at the concave part 216b. The shaft part 51 is a substantially cylindrical shape having a bottom surface substantially the same as the opened shape of the rolling element insertion hole 4 and has a front end constituted by a concave arc shaped part 51a and flat parts 51b formed at the two edges. The concave arc shaped part 51a has an arc surface which constitutes part of the inner circumference of the return passage 212a. Due to this, the front end part of the shaft part 51 becomes a shape matching the circle of the cross-sectional shape of the return passage 212a vertical to the rolling element movement direction.

The flat parts 51b of the shaft part 51 are surfaces which correspond to the bottom surface 41 of the rolling element insertion hole 4. The length of the shaft part 51 to the flat parts 51b is substantially the same as the depth of the rolling element insertion hole 4 (a distance from concave part 216b of the slider body 21 to the bottom surface 41). The plate shaped part 52 is formed with bolt holes 52a at positions which corresponds to the female threads 216c of the concave part 216b.

This guide device is assembled by the following method.

First, the slider body 21 is placed over the guide rail 1 to arrange the two leg parts of the slider body 21 at the two sides of the guide rail 1 in the width direction. Next, at one end part of the slider body 21 in the movement direction, split members 22a and 22b of an end cap 22 split into left and right parts are attached at the outside and inside of the guide rail 21.

Next, from the other end part of the slider body 21 at which no end cap 22 is attached, balls are inserted into the return passage 212b to which the rolling element insertion holes 4 of the slider body 21 are not communicated and are made to reach the direction changing path 221b of the end cap 22 fastened to the slider body 21.

At this point of time, there is looseness between the slider body 21 and the guide rail 1. Further, by pushing and inserting balls 3 in the return passage 212b, the balls 3 move from the direction changing path 221b between the rolling grooves 11b of the guide rail 1 and the rolling grooves 211b of the slider body 21 (second rolling passage). Accordingly, by this method, balls 3 are assembled in the parts other than the parts of the circulation path which has the return passage 212b to which the rolling element insertion holes 4 are not communicated (direction changing path 221b formed at other end cap 22).

Figure 7:
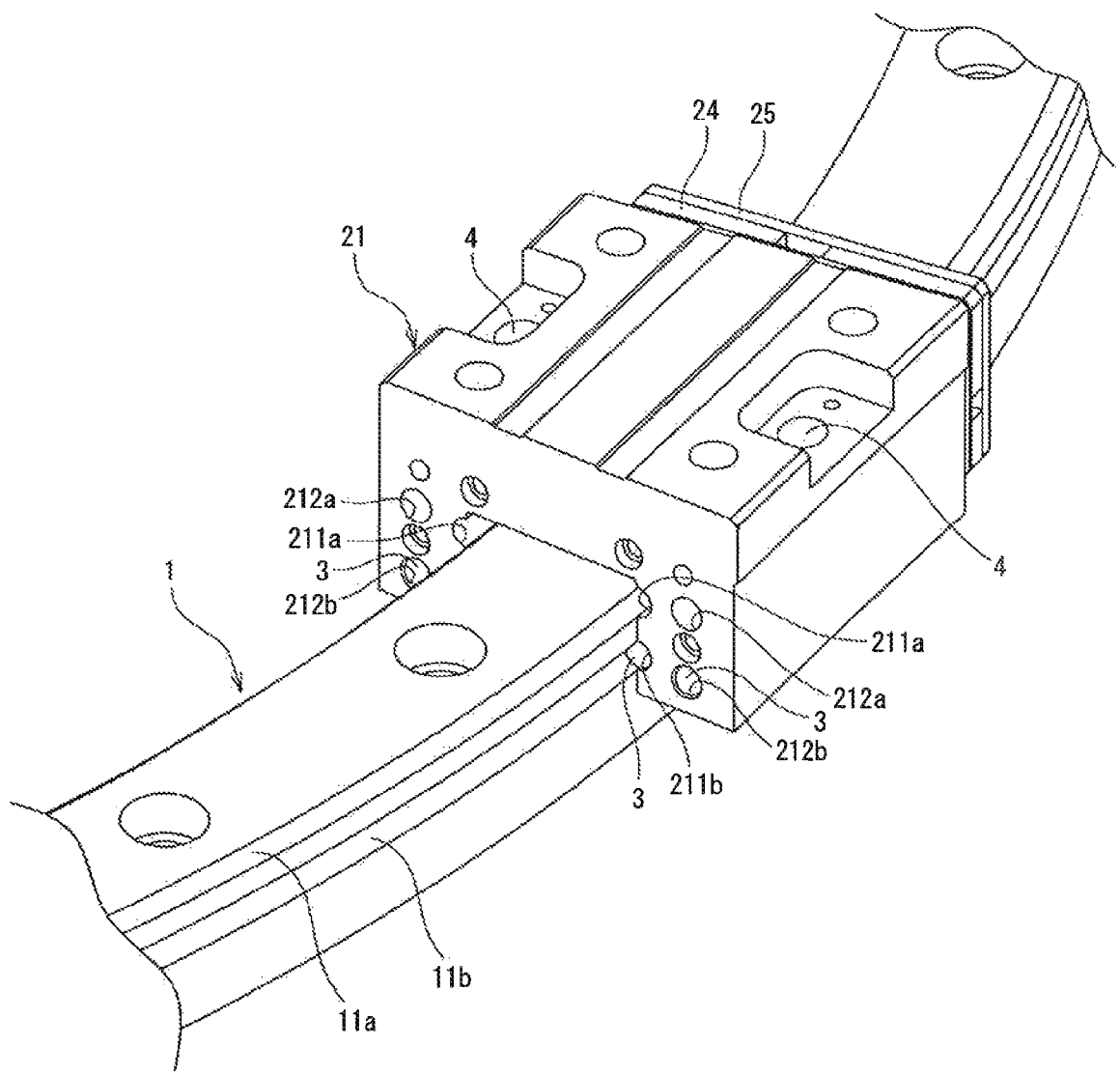
FIG. 7 is a perspective view which explains a method of assembly of a guide device of an embodiment.

In this state, in the circulation path which has the return passage 212b to which the rolling element insertion holes 4 are not communicated, among all of the balls 3, the amount of the balls 3 which enter the direction changing path 221b of the other end cap 22 are still not assembled. The circulation path which has the return passage 212a to which the rolling element insertion holes 4 are communicated still do not have all of the balls 3 assembled into them. FIG. 7 shows this state.

Next, the balls 3 are assembled into the direction changing path 221b of the other end cap 22 and the end cap 22 is attached to the other end of the slider body 21 in the movement direction. At this time, the remaining balls 3 are all assembled into the direction changing path 221b which constitutes the second circulation path to fill the direction changing path 221b.

Figure 8:
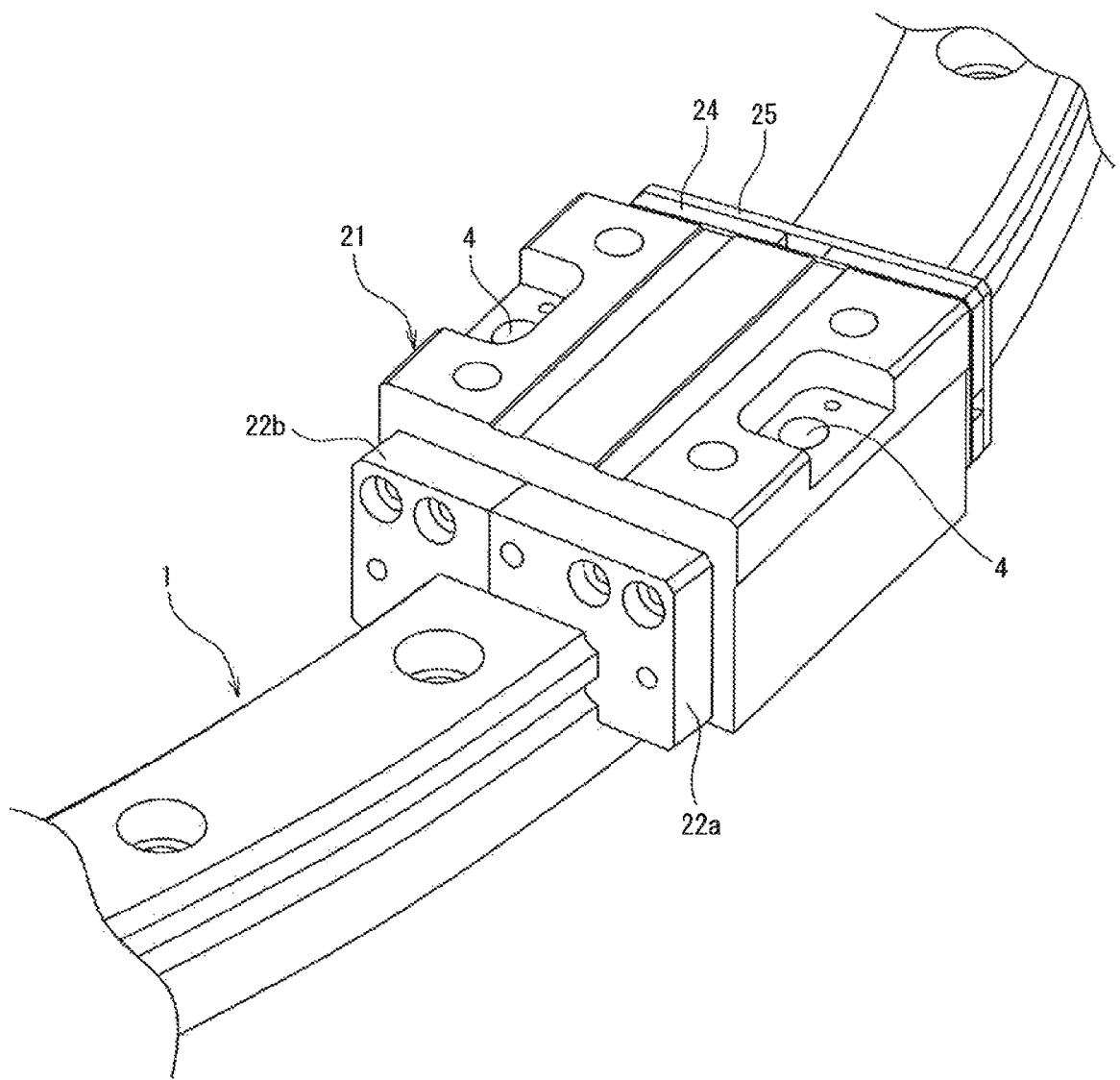
FIG. 8 is a perspective view which explains a method of assembly of a guide device of an embodiment.

FIG. 8 shows this state. In this state, the second circulation path which has the return passage 212b to which the rolling element insertion holes 4 are not connected are loaded with all of the balls 3. However, the first circulation path which has the return passage 212a to which the rolling element insertion holes 4 are communicated are still not loaded with the balls 3.

Next, if inserting one ball 3 in a return passage 212a visible from an opening of a rolling element insertion hole 4, inside the return passage 212a visible from the opening of the rolling element insertion hole 4, there is a space (S in FIG. 5) in the rolling element movement direction of the inserted ball 3a.

Figure 9:
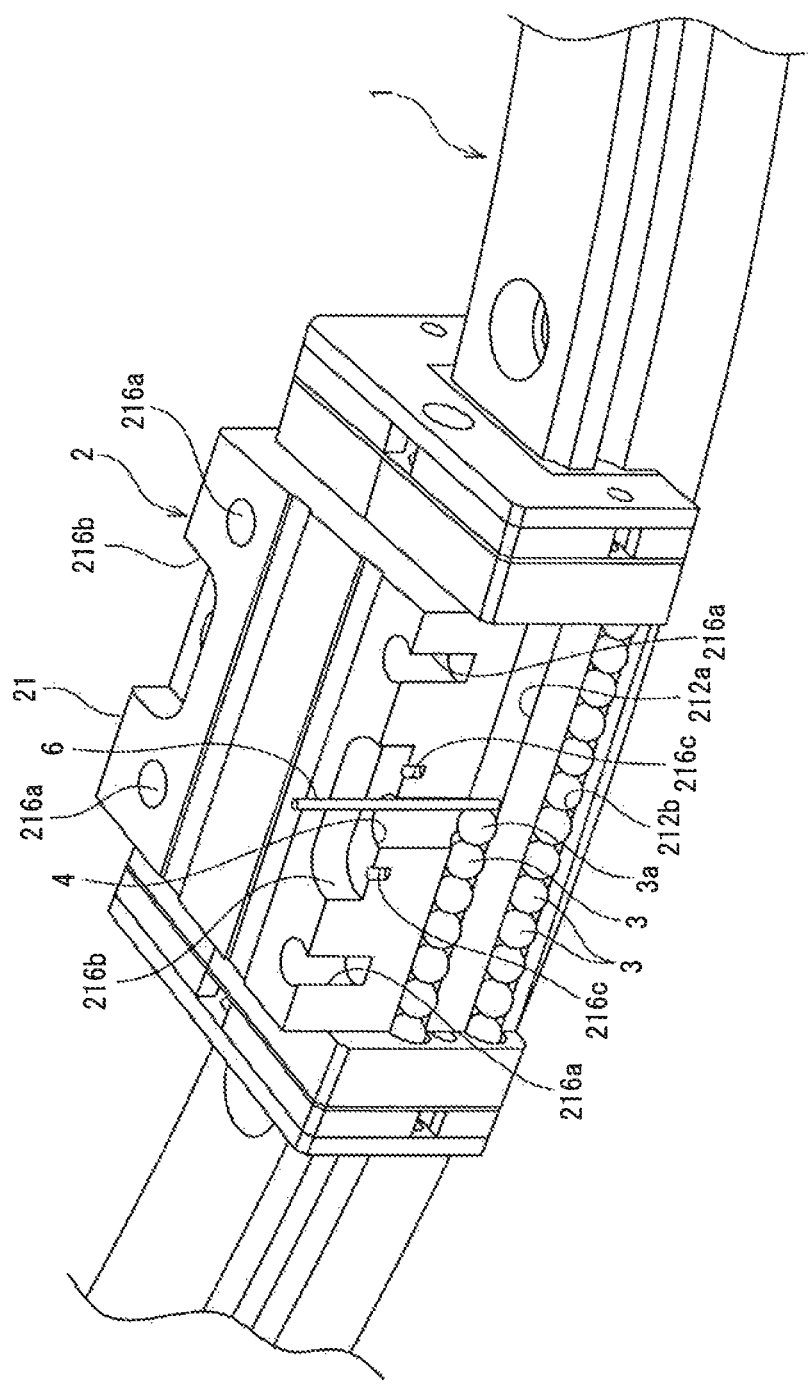
FIG. 9 is a perspective view which explains a method of assembly of a guide device of an embodiment.
Figure 10:
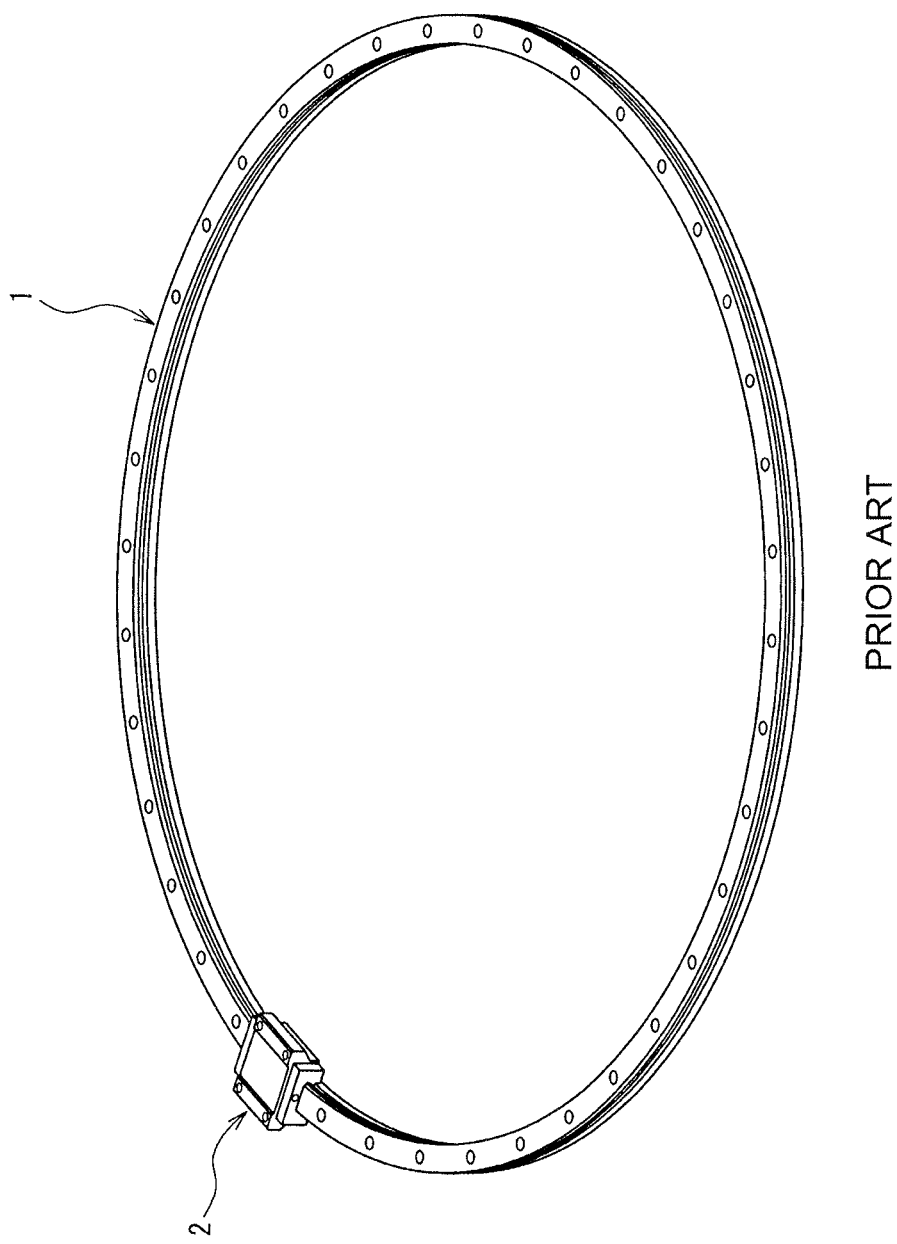
FIG. 10 is a perspective view which shows a curved guide device as a whole.

For this reason, as shown in FIG. 9, it is possible to insert a rod-shaped fixture 6 into this space and apply a force which pushes the balls 3a in the rolling element movement direction of the return passage 212a. Due to the force which pushes the balls 3a, just one of the balls 3 in the return passage 212a is moved to the direction changing path 221b side. By repeating this, the balls 3 inside of the return passage 212a are made to move through the rolling passage through the direction changing path 221b to assemble all of the balls 3 in the first circulation path (circulation path having the return passage 212a which communicates with the rolling element insertion hole).

Due to this, even in the case of a preloaded device, force acts on the balls 3 inside of the rolling passage to make them move and easily closes the gaps inside of the rolling passage. That is, if compared with the case with no such space, it is possible to shorten the time relating to the assembly work of balls 3 of preloaded devices.

Next, a shaft part 51 of each lid 5 is inserted into the rolling element insertion hole 4 and a plate shaped part 52 is arranged at a concave part 216b. In this state, the concave arc part 51a of the shaft part 51 constitutes part of the internal surface of the return passage 212a, and the flat parts 51b contact the bottom surface 41 of the rolling element insertion hole 4 or face the bottom surface 41 with a slight gap. Next, bolts are inserted from the bolt holes 52a of the plate shaped part 52 and screwed with the female threads 216c to fasten the lid 5. Due to this, the rolling element insertion hole 4 is reliably closed by the lid 5 and the balls 3 can smoothly move through the position of the return passage 212a where the rolling element insertion hole 4 is formed.

Note that, in this embodiment, the lid 5 is a member constituted by the shaft part 51 and the plate shaped part 52 formed together, but the shaft part 51 and the plate shaped part 52 may also be constituted by separate members.

Further, in this embodiment, a guide device with a guide rail endless and having two pairs of four circulation paths have been explained, but the present invention can also be applied to a guide device with a guide rail which is linear, can also be applied to a guide device having one pair of two circulation paths, and can also be applied to a guide device having more than two pairs of four circulation paths.

REFERENCE SIGNS LIST 1 guide rail
11a, 11b rolling groove (rolling surface)
2 slider
21 slider body
21 mounting hole
21A leg part of slider body
21B body part of slider body
211a, 211b rolling groove (rolling surface)
212a, 212b return passage
213 mounting hole
214 mounting hole
216 member mounting surface of slider body
216a mounting hole
216b concave part
216c female thread
22 end cap
221a, 221b direction changing path
23 protective plate
24 lubricant-including member
25 side seal
26 return guide
3 balls (rolling elements)
4 rolling element insertion hole
41 bottom surface of rolling element insertion hole
5 lid covering rolling element insertion hole
51 shaft part of lid
51a concave arc-shaped surface part
51b flat part
52 plate shaped part of lid
52a bolt hole
6 rod-shaped fixture
S space of return passage in rolling elements movement direction of inserted balls

The invention claimed is:

1. A guide device comprising:
a guide rail;
a slider; and
a plurality of rolling elements, the slider comprising:
  a slider body; and
  end caps that are configured to be fastened to both ends of the slider body in a moving direction of the slider, the slider body comprising:
    a main body part that is configured to extend to both ends of the slider body in a width direction of the guide rail; and
    a pair of leg parts that are configured to extend in a height direction of the guide rail from both ends of a bottom face of the main body part, a surface of the main body part at the opposite side from the guide rail being a member mounting surface, wherein
    the guide rail and slider have rolling surfaces that are arranged to face each other and that are configured to constitute a rolling passage of the plurality of rolling elements,
    the slider body has a return passage of the plurality of rolling elements,
    the return passage is a through hole opened at both ends of the slider body in the moving direction of the slider,
    each of the end caps has a direction changing path which communicates the return passage and the rolling passage,
    the rolling passage, the return passage, and the direction changing path are configured to constitute a circulation path of the plurality of rolling elements,
    the plurality of rolling elements are circulated through the circulation path, and one of the guide rail or the slider moves relative to the other along the guide rail, and
    the slider body has a rolling element insertion hole opened at a first location above each of the pair of leg parts, above the return passage and at a depression part of the member mounting surface of the slider body, extends in a height direction of the leg parts to reach a second location where a circular-shaped cross section of the return passage is bisected, and communicates with the return passage, an opening of the rolling element insertion hole is configured such that in a planar view, a dimension of the rolling element insertion hole extending in a rolling element moving direction is larger than a dimension of the rolling element insertion hole extending in the width direction of the return passage.

2. The guide device according to claim 1, wherein the guide rail has an endless shape.

3. The guide device according to claim 1, wherein the slider has a lid which covers the rolling element insertion hole and the lid is held at the depression part of the member mounting surface.

4. The guide device according to claim 3, wherein the lid has a shaft part which fits in the rolling element insertion hole and a plate shaped part arranged at the depression part.

5. The guide device according to claim 4, wherein a front end of the shaft part has a shape which matches a cross-sectional shape of the return passage perpendicular to the rolling element movement direction.

6. The guide device according to claim 5, wherein the rolling element insertion hole has a bottom surface, the front end of the shaft part is formed with a flat part corresponding to the bottom surface, and the flat part is in contact with the bottom surface or the flat part faces the bottom surface through a preset gap.

* * * * *